United States Patent [19]

Fu et al.

[11] Patent Number: 5,425,909
[45] Date of Patent: Jun. 20, 1995

[54] HEAT TREATMENT FOR PARTICLE REINFORCED ALUMINA CERAMIC COMPOSITE

[75] Inventors: Chen-Tsu Fu; Ai-Kang Li, both of Hsinchu, Taiwan, Prov. of China

[73] Assignee: Industrial Technology Research Institute, Hsinchu, Taiwan, Prov. of China

[21] Appl. No.: 916,886

[22] Filed: Jul. 20, 1992

[51] Int. Cl.$^6$ .................. C04B 38/06; C04B 35/10
[52] U.S. Cl. ................................ 264/44; 264/65; 264/66
[58] Field of Search .................. 264/44, 65, 66, 60

[56] References Cited

U.S. PATENT DOCUMENTS

| | | | |
|---|---|---|---|
| 3,791,861 | 2/1974 | Sundahl | 427/419.2 |
| 4,221,748 | 9/1980 | Pasco et al. | 264/65 |
| 4,657,877 | 4/1987 | Becher | 501/89 |
| 4,789,277 | 12/1988 | Rhodes | 409/131 |

FOREIGN PATENT DOCUMENTS

| | | |
|---|---|---|
| 61-286272 | 12/1986 | Japan . |
| 2124761 | 5/1990 | Japan . |
| 2141467 | 5/1990 | Japan . |
| 2229758 | 9/1990 | Japan . |
| 2255761 | 10/1990 | Japan . |
| 2279558 | 11/1990 | Japan . |

*Primary Examiner*—James Derrington
*Attorney, Agent, or Firm*—Ladas & Parry

[57] ABSTRACT

A heat treatment method is disclosed for improving the strength and the toughness of particle reinforced alumina composite. A densified alumina composite is heated to a temperature of higher than 600° C., maintained at that temperature for about 0.5–150 hours, and then the temperature is lowered to room temperature. As a result, the flexure strength and the fracture toughness of the particle reinforced alumina composite are substantially increased after the heat treatment in comparison to those without heat treatment.

6 Claims, 7 Drawing Sheets

HEAT TREATMENT FOR PARTICLE REINFORCED ALUMINA CERAMIC COMPOSITE

BACKGROUND OF THE INVENTION

The present invention relates to a heat treatment for alumina ceramic composite, particularly to a heat treatment for particle-reinforced alumina ceramic composites.

Alumina is a popular material used in industries, since it has some excellent properties, such as high strength, high hardness and high corrosion resistance. However, it still has problems of lack of toughness and low reliability preventing it from wider applications. Many people, therefore, have tried to increase its toughness and reliability by making alumina-based composite.

Conventionally, there are two methods for making ceramic composite, i.e., adding fiber (or short fiber), or adding particle as reinforcement. Experiments have shown that fiber will toughen and strengthen properties, but it is difficult to obtain an fully densified ceramic composite. The particle reinforced ceramic composite, on the other hand, can be sintered to an full densified ceramic body, yet its mechanical properties are not so good as the fiber reinforced one.

In general, the process of making particle reinforced ceramic composite is more convenient and less expensive than that of fiber/whisker reinforced ceramic composite alumina composite. For example, the sintering temperature for alumina composite is lowered from 1850° C. ($Al_2O_3$/SiCw, added with silicon carbide whisker) to 1400° C. ($Al_2O_3$/$Cr_3C_2P$, added with chromium carbide particles), therefore the latter process saves a lot of energy. The use of ceramic whisker or short fiber may carcinogenic, so ceramic particle is move acceptable to the operators. In addition, the price of ceramic powder is much lower than that of ceramic fiber or whisker; also the mechanical properties of particle reinforced ceramic composite is anisotropic so it has wider applications.

According to some Japanese and U.S. patents, the processing steps used and described in Japan Patents, No: 02-124761, No: 02-141467, No: 02-229758, No: 02-279558, No: 02-255561 and No: 61-286272, and U.S. Pat. No: 4,789,277 and U.S. Pat. No. 4,657,877 are almost the same (as shown in FIG. 1). However, the reinforcements added to each of these ceramic composites are different. In summary, the main kind of reinforcements used in the composites and their contents are: A. silicon carbide whiskers (10–40 vol %); B. zirconia particles (7–35 wt %); C. sintering agent for alumina (0.7–7 wt %), i.e., more than one kind selected from CaO, MgO, $SiO_2$, NiO or $Y_2O_3$ etc.; D. sintering agent for silicon carbide (0.05–5 wt %), e.g., B, C, AlN and $B_4C$ etc.; E. particulate carbide, boride or nitride of an element selected from groups IVA, VA or VIA of periodic table (5–30 wt %); and F. the ceramic composite is balanced stoichiometrically using alumina ($Al_2O_3$). Although the strength and the toughness of ceramic composites with particulate reinforcement is much higher than the single phase ceramic monolith, there are still some disadvantages existed as will be described in the following paragraphs.

For the combination of B+F, the toughness has been increased greatly due to the phase transformation of $ZrO_2$. However, this advantage will be diminished at high temperatures, especially when T>1100° C. The hardness of the composite is lowered due to the addition of $ZrO_2$.

For the combination of A+F or A+E+F, whisker or whisker/particles is used to reinforce ceramic composites. However, a high sintering temperature is required for obtaining high density as well as high toughness, for example, the hot-pressing temperature usually has to be greater than 1800° C.

Combination A+C+D+E+F, in which additional sintering agents for $Al_2O_3$ and SiC are used, it still requires a high hot-pressing temperature, i.e., higher than 1650° C., to produce an full densified ceramic body. An adverse effect is difficult to homogenize so many additives and defects may appear within the composites thus consequentially may lower the strength and toughness.

For combination of E+F, although densified ceramic composites can be produced at a lower temperature (higher than 1300° C.), the strength and toughness of the product are not high enough.

As a result, the addition of ceramic particles of carbide, boride and nitride particles in alumina can lower its sintering temperature. Yet the strengthening and toughening effects are low, so the application of the particulate reinforced alumina is restricted.

SUMMARY OF THE INVENTION

The object of the present invention is to provide a method to enhance the toughening effect of particle reinforced alumina composite.

To achieve the object stated above, the present invention provides a heat treatment for a sintered alumina ceramic composite to improve the strength and toughness of the ceramic composite. The heat treatment tends to oxidize the particles that remain on the surface layer of the densified ceramic composite so that the surface layer becomes porous while the internal portion of the ceramic composite is kept in its original densified state. Those micropores may cause crack blunting and energy dissipation and the composite becomes toughened thereafter.

DETAILED DESCRIPTION OF THE INVENTION

The present invention involves a heat treatment method for a particle reinforced alumina composite. Alumina added with a suitable amount of particles is sintered conventionally to produce a densified ceramic body. Then the ceramic body is heated to a temperature greater than 600° C. in an oxidizing atmosphere, and kept at that temperature for certain period of time. After that, the temperature is lowered to room temperature. Particles remained in a thin layer on the surface of the ceramic composite are oxidized during the heat treatment and volatilized as gas. As a result, the surface layer of the ceramic composite may form a thin porous layer, of course, the internal portion of the ceramic composite remains unchanged.

Other features and advantages of the invention will be apparent from the following example, in the connection with the accompanying drawings wherein:

FIG. 5a is a SEM micrograph of the alumina composite before heat treatment;

FIG. 5b is a SEM micrograph of the alumina composite after a heat treatment for 40 hours at 1200° C.;

EXAMPLE

Alumina used as the matrix material is well mixed with 10 vol % to 30 vol % of chromium carbide ($Cr_3C_2$) and other suitable additives. The powder mixture is sintered to produce a densified ceramic body according to the conventional process as shown in FIG. 1, wherein the sintering temperature or hot pressing temperature is within the range of 1200°–1700° C.

The particle reinforced alumina ceramic composite is heated to a temperature of above 600° C., preferably 800–1400° C. in air (i.e., an oxidized atmosphere, wherein the partial pressure of oxygen is about 0.05–10 atm), and kept at that temperature for a period of time, 0.5–150 hours. Lastly, the temperature is air cooled to room temperature. Subsequently, some tests can be carried out to determine the mechanical properties of the ceramic composite after heat treatment, and some results are shown in FIG. 1, 2 and 3.

Figure 1:
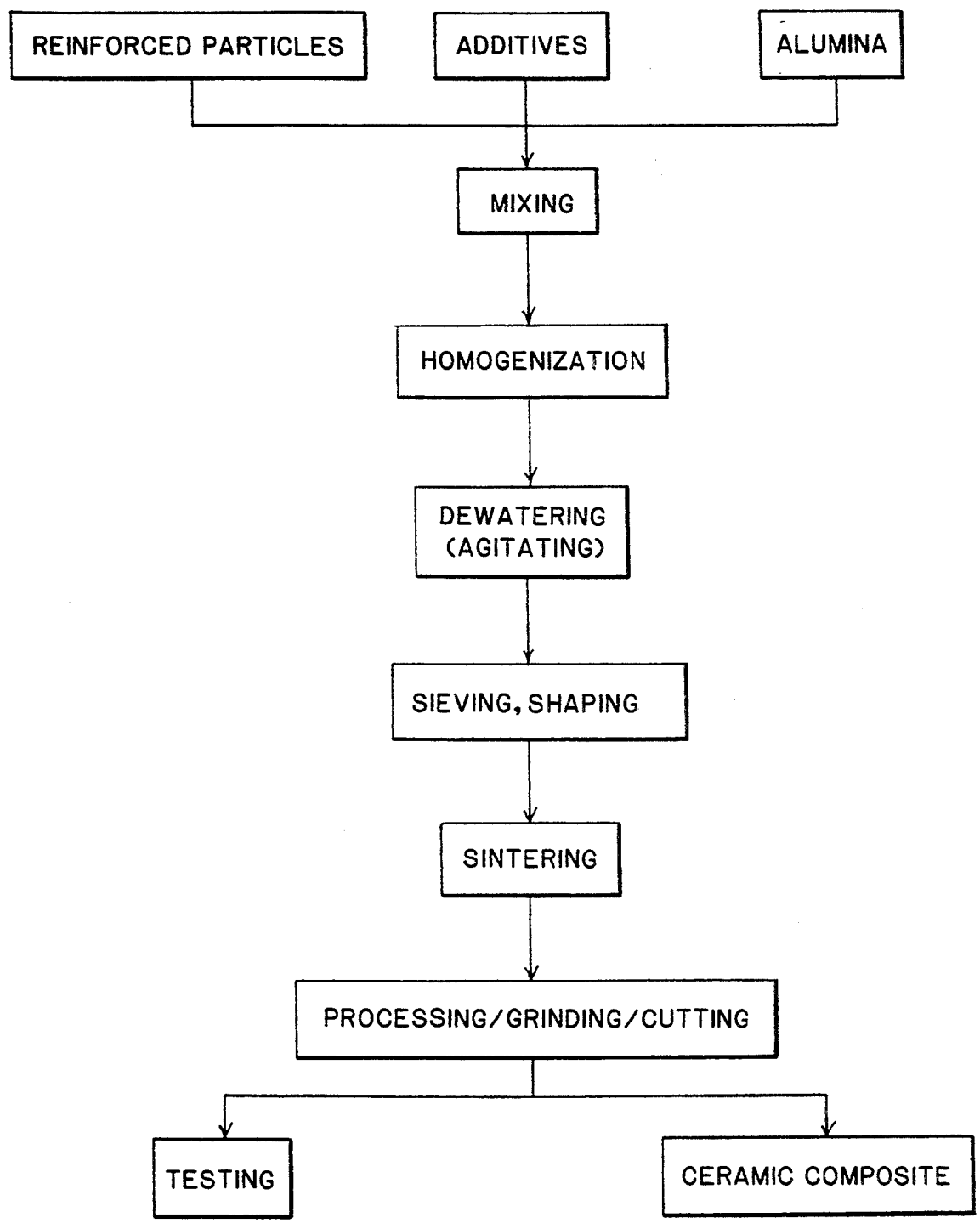
FIG. 1 is a flowchart of the conventional process for manufacturing alumina matrix ceramic composite.

FIG. 1 shows the result of flexure strength tested using four-point bending test of the ceramic composite after the heat treatment at 1000° C. with different oxidation durations. As shown in FIG. 1, all the heat treated $Cr_3C_2$ particles reinforced alumina composites have higher flexure strength than the ceramic composites without heat treatment. For comparison, a pure alumina sintered body without adding any reinforcement or heat treatment have shown a flexure strength of 320 MPa.

Figure 2:
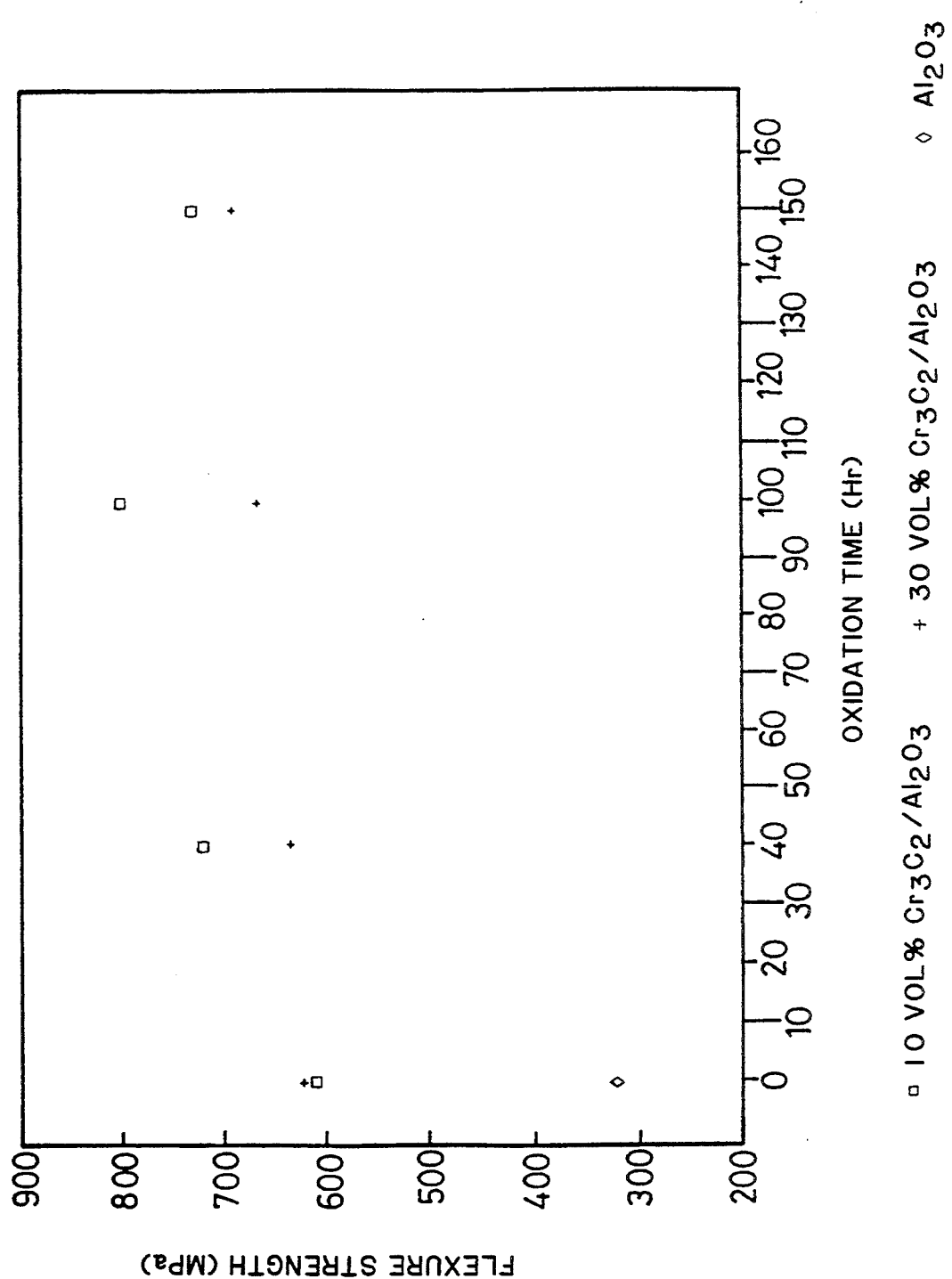
FIG. 2 is the flexure strength of the alumina composite in the example after heat treatments of different time at 1000° C.
Figure 3:
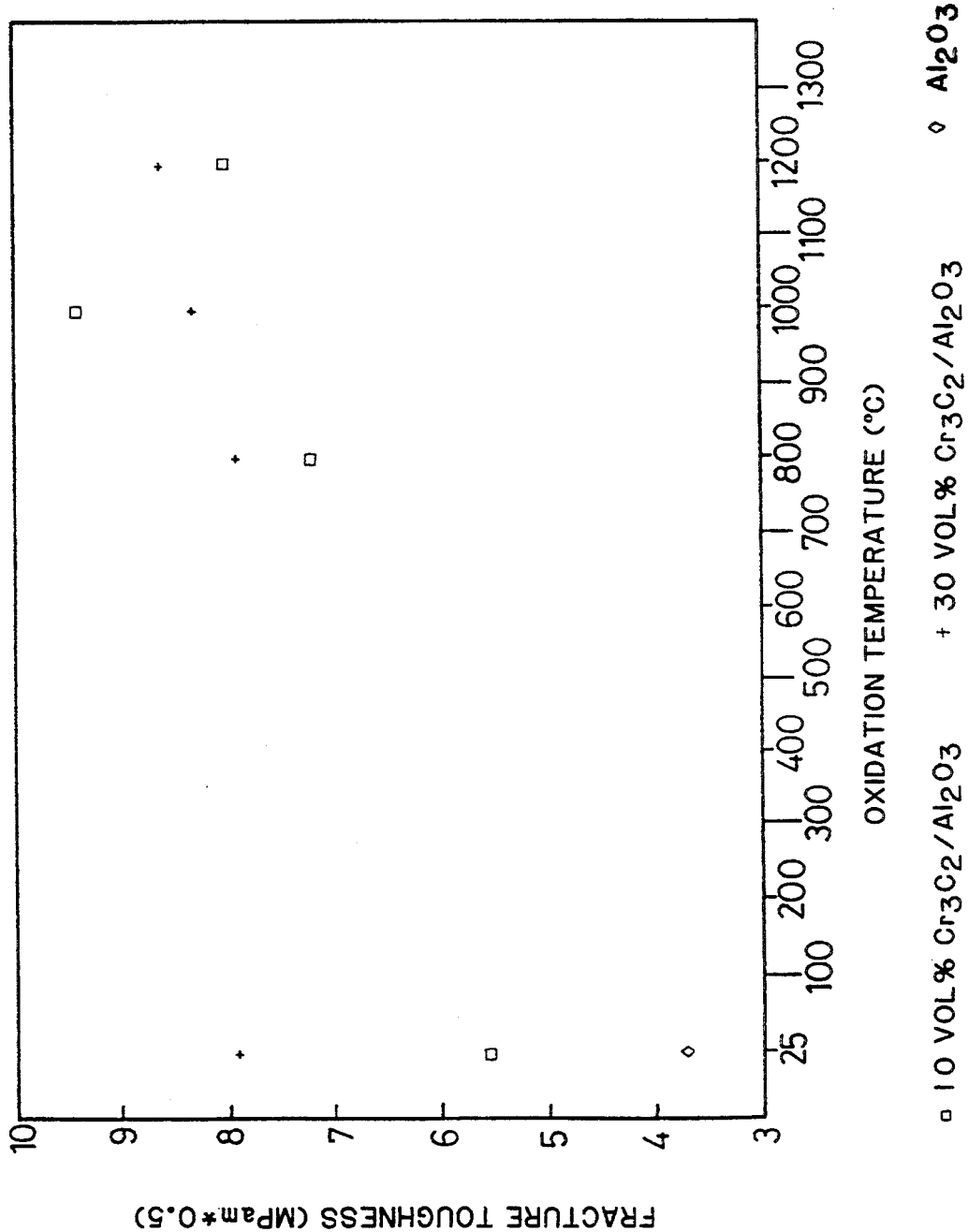
FIG. 3 is the fracture toughness of the alumina composite in the example after a heat treatment of 40 hours at different temperatures.
Figure 4:
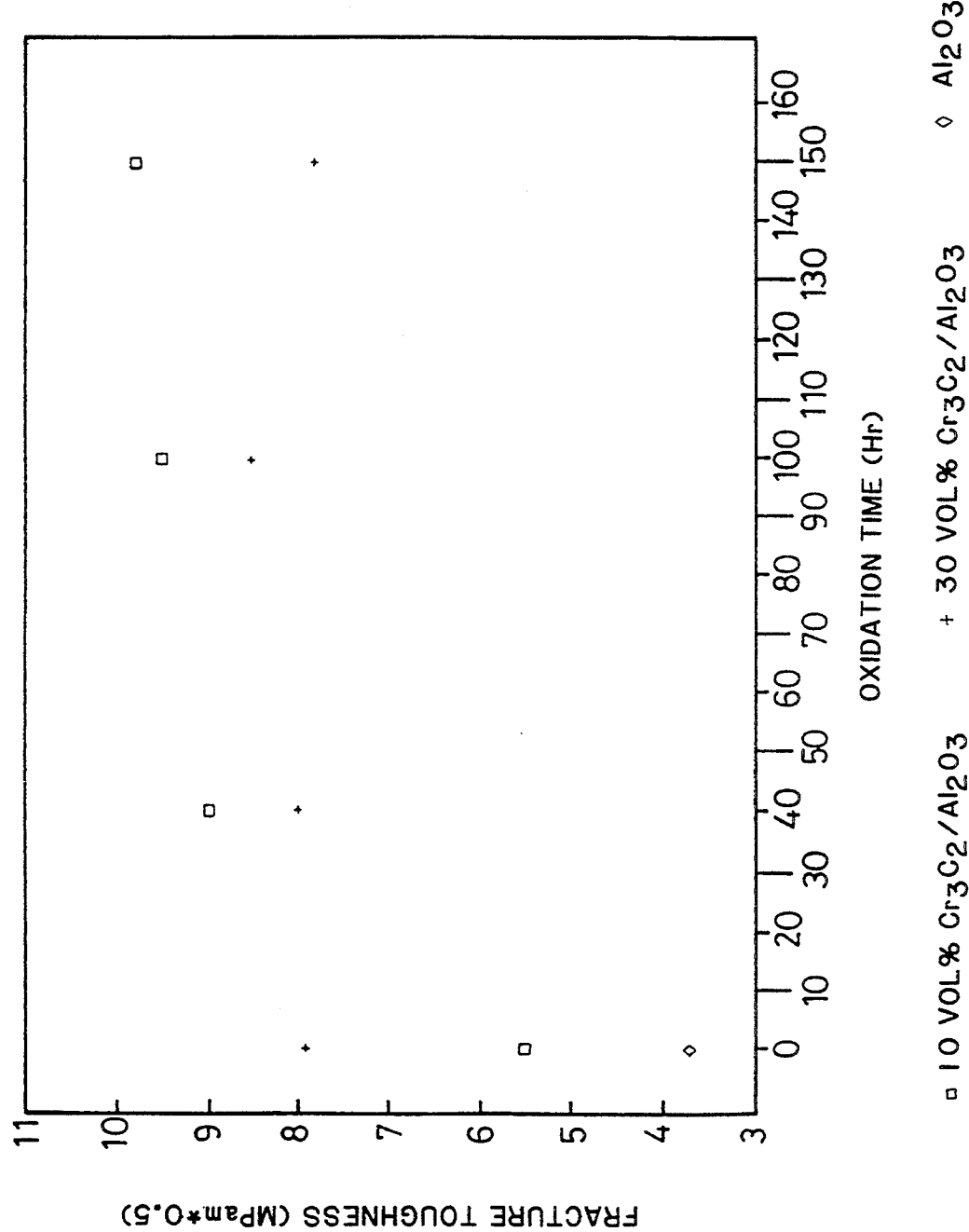
FIG. 4 is the fracture toughness of the alumina composite in the example after heat treatments of different time at 1000° C.

It can be seen from FIG. 2 that the fracture toughness of the alumina composite is increased remarkably after heat treatment for 40 hours at different temperatures in comparison to the ceramic composite without heat treatment. Also, as shown in FIG. 3, the results show that the fracture toughness of the 10 vol % $Cr_3C_2$ or 30 vol % $Cr_3C_2/Al_2O_3$ ceramic composite is improved significantly after the heat treatment at 1000° C. for different periods of time.

The ceramic composite was observed under a SEM (scanning electron microscope) before and after the heat treatment. The surface of the ceramic composite which is originally smooth (FIG. 5a), forms a porous layer (FIG. 5b) after the heat treatment since the $Cr_3C_2$ particles in the surface layer is oxidized and volatilized out. The thickness of the porous layer can be controlled from about 0.1–50 μm, the pore sizes are varied from 0.2 to 30 μm in diameter, and the porosity is within the range of 2–40% of the surface layer.

Figure 6:
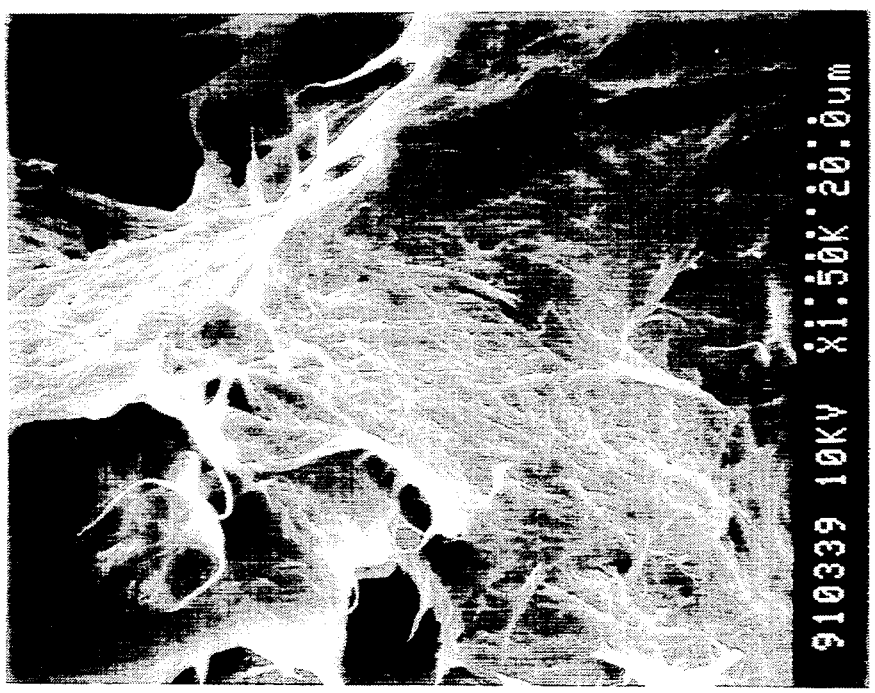
FIG. 6a is a cross-sectional metallographic microstructure of the alumina composite before heat treatment.
FIG. 6b is a cross-sectional metallographic microstructure of the alumina composite after a heat treatment for 100 hours at 1200° C.
Figure 6A:
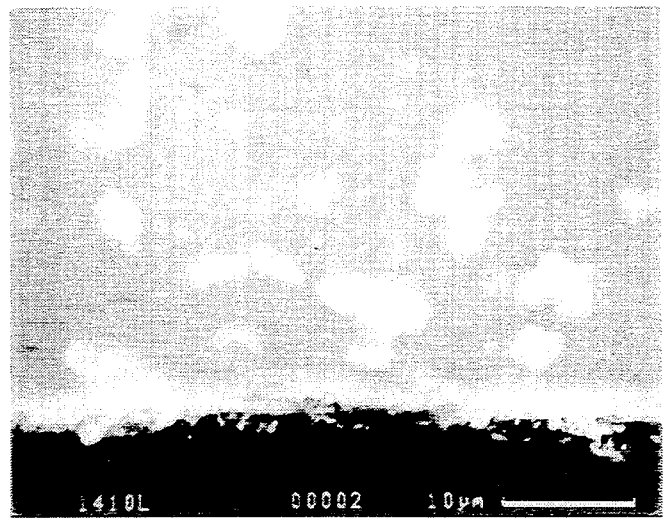
Figure 6B:
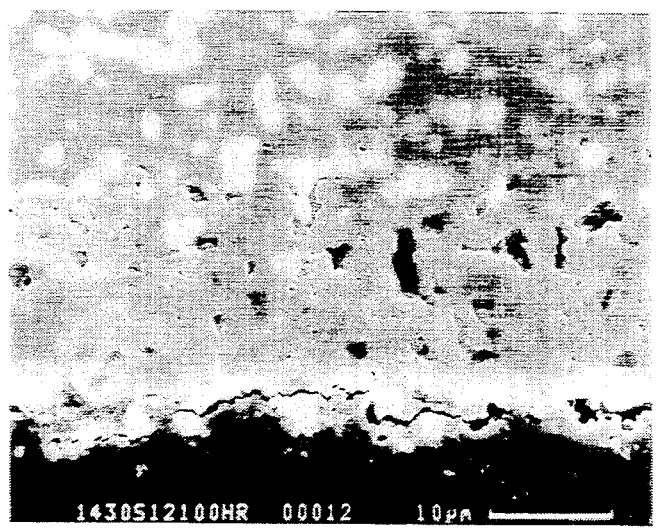
Figure 7:
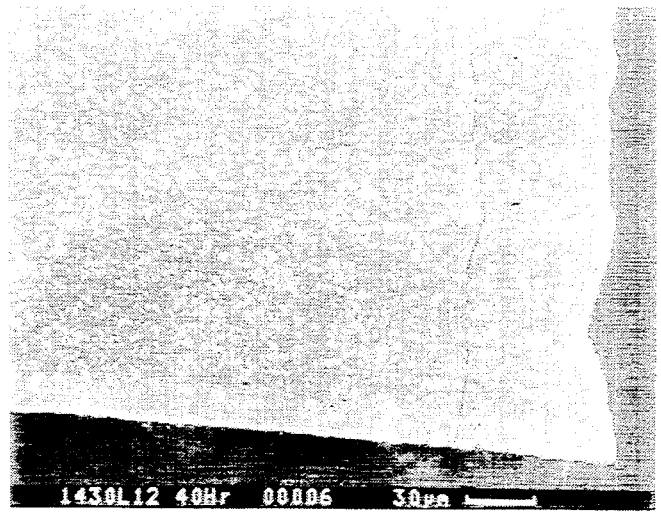

The cross sectional metallographic microstructure of the ceramic composite before and after heat treatment are shown in FIG. 6a and 6b. After the heat treatment, a porous layer (black dots as shown in FIG. 6b) has formed on the surface of the ceramic composite, wherein contains $Cr_3C_2$ particles originally (white dots as shown in FIG. 6a).

Figure 7:
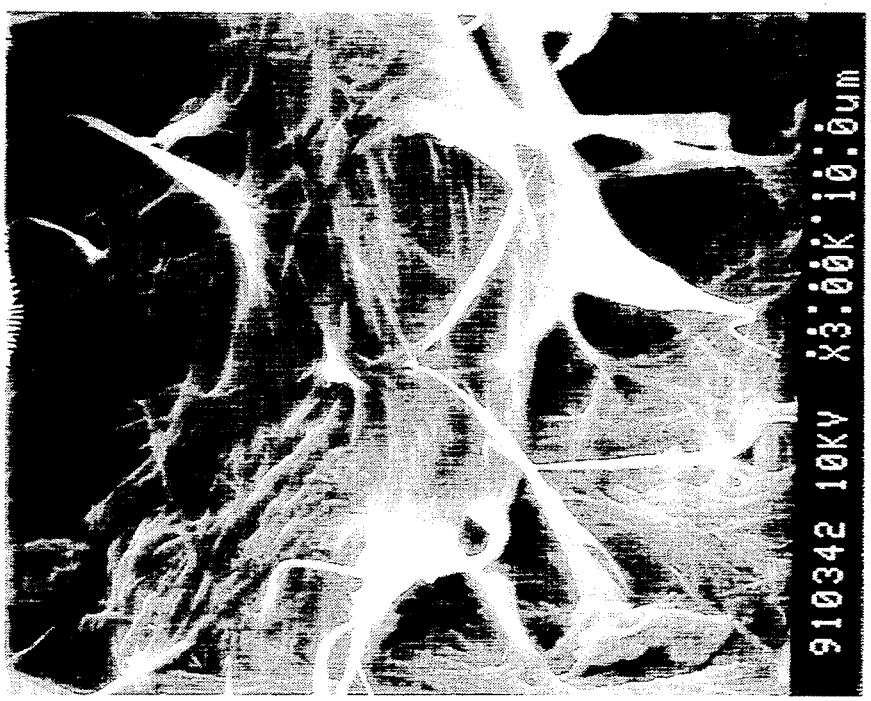
FIG. 7 is a SEM micrograph of the alumina composite after a destruction test.

The neat-treated ceramic composite was subjected to a destruction test, and the results are shown in FIG. 7. Some small subcracks were found on the surface of the composite, but since the pores have an effect on blunting the tip of the cracks or on dispersing the stress of the cracks, they can enhance the toughening effect significantly. However, The internal portion of the ceramic composite is being kept as its original reinforcing and toughening effect of the particles.

In conclusion, particle reinforced alumina composite can be further increased in flexure strength and fracture toughness through the heat treatment of the present invention. Therefore, the characteristics of the present invention is the ability to improve the lack of the toughness of conventional ceramic composites.

It should also be understood that the foregoing statement relates only to the scope of the invention as defined by the appended claims rather than by the description preceeding them.

What is claimed is:

1. A heat treatment for particle reinforced alumina composite comprising:
   a. preparing an alumina based powder mixture with additions of chromium carbide particles;
   b. sintering said alumina based powder mixture to produce a densified alumina ceramic composite;
   c. heating said densified alumina composite to a temperature higher than 600° C. in an oxidized atmosphere, and maintaining at the temperature for about 0.5–150 hours to oxidize the particles on the surface of said alumina composite to form a porous surface layer, wherein the amount of said particles in the ceramic composite is 10–30 vol %; and
   d. lowering the temperature to room temperature.

2. A heat treatment as claimed in claim 1, wherein said oxidized atmosphere is air, and the partial pressure of the oxygen in the air is 0.05–10 atm.

3. A heat treatment as claimed in claim 1, wherein said densified alumina composite is heated to a temperature of about 800°–1400° C.

4. A heat treatment as claimed in claim 1, wherein the thickness of said porous surface layer is about 0.1–50 μm.

5. A heat treatment as claimed in claim 1, wherein the porosity of said surface layer is 2–40%.

6. A heat treatment as claimed in claim 1 wherein the particle reinforced alumina composite has the surface and an internal portion, the heat treatment forming a porous layer at the surface of the composite, the internal portion thereof being maintained in its original densified state.

* * * * *